US005549478A

United States Patent [19]
McGuire

[11] Patent Number: 5,549,478
[45] Date of Patent: Aug. 27, 1996

[54] UNIVERSAL TRAILER LIGHT LOCATOR

[76] Inventor: David McGuire, P.O. Box 129, Apache Junction, Ariz. 85217

[21] Appl. No.: 376,030

[22] Filed: Jan. 20, 1995

[51] Int. Cl.⁶ ..................................... B60L 1/00
[52] U.S. Cl. .......................... 439/35; 439/620; 307/10.1; 340/431; 315/77
[58] Field of Search ............... 439/35, 76, 620; 307/10.1; 315/77; 340/431, 458, 475

[56]     References Cited

U.S. PATENT DOCUMENTS

| | | | |
|---|---|---|---|
| 3,970,860 | 7/1976 | Purdy | 307/10 LS |
| 4,325,052 | 4/1982 | Koerner | 340/67 |
| 4,781,393 | 9/1988 | Jeter | 280/422 |
| 5,030,938 | 7/1991 | Bondzeit | 340/431 |
| 5,285,113 | 2/1994 | Schlich | 307/10.1 |
| 5,389,823 | 2/1995 | Hopkins et al. | 307/10.1 |

Primary Examiner—Gary F. Paumen
Attorney, Agent, or Firm—Snell & Wilmer L.L.P.

[57]           ABSTRACT

A versatile, water-resistant trailer interface device that is capable of adaptation to a variety of connector assemblies. The mechanical and electrical apparatus is comprised of versatile connectors, a circuit board, indicator lights, resistors, a test circuit, wires and a casing. The user can test and connect each pin separately without the need for special tools. The large resistor prevents the destruction of automobile or trailer fuses.

23 Claims, 2 Drawing Sheets

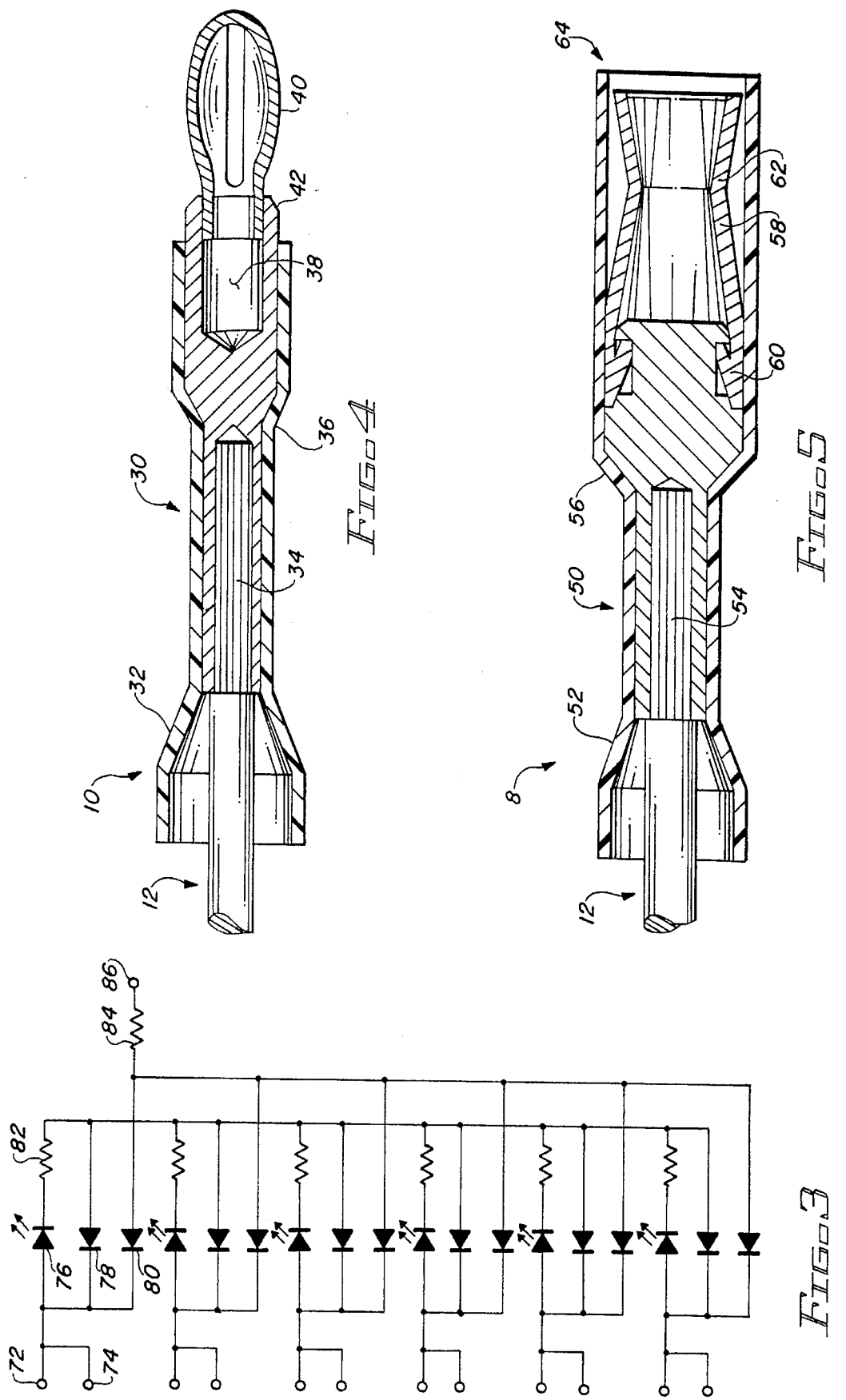

UNIVERSAL TRAILER LIGHT LOCATOR

FIELD OF THE INVENTION

The present invention relates to a universal electrical and mechanical interface capable of adaptation to a variety of connector assemblies. The device of the present invention is based on the principle of testing and connecting each pin separately with a versatile connector. The user follows a pattern for selecting the correct wire for connection without the need for special tools. Separately connecting each pin offers unlimited versatility with various connectors and the resistor prevents destruction of fuses.

BACKGROUND OF THE INVENTION

Existing trailers must be equipped with taillights which operate in concert with the taillights of the towing vehicle. The conventional trailer interface, as we know it today, contains a wide assortment of connectors including 3 pin, 4 pin, 5 pin or 6 pin, round, square or flat. The electrical connections can be the ground, running lights, left blinker/brake light, right blinker/brake light, electric trailer brakes or a charging circuit. A problem associated with trailer connectors is the lack of uniformity with the automobile connectors. Existing connector interfaces are limited to certain size and shape connectors. The mechanical connection between two 3 pin connectors may be impossible because of the varying pin and hole sizes. A connector which could adapt to all hole and pin sizes would be an important improvement. Even if the mechanical connection is adequate, the electrical connection may be inconsistent. The automobile plug consists of an entire set of male pins which must conform to an entire set of female receiving holes in the trailer plug. A trailer interface which tests and connects each pin separately would be advantageous.

The procedure available today requires the user to spend considerable time connecting different trailer interfaces. Each time a new trailer or a new automobile is connected, the user must spend extra time determining the proper connection sequence. Special tools may be required for different trailer connections which also can add to the expense of the project.

The current procedure for connecting the interfaces is also problematic in that it is a trial and error type approach with the consequences of destroying circuits and fuses during each connection. No system for indicating a proper connection, before destroying a fuse, exists. If the wire for the brakes is accidentally connected to the charging circuit, the brake fuses would be destroyed while testing the connection. The user must connect and disconnect the male wire to each female wire until a proper connection is achieved, so many fuses can be destroyed each time a trailer is connected. Connecting the wrong wire can also cause the malfunctioning of vital, legally- required automobile functions. An organized system for testing and indicating proper connections, without destroying fuses, is needed.

Once connected, the plugs and wires on existing devices are subject to damage. Loose wires may drag on the road or get intermixed with other automobile wires, while the connected wires may be bent or pulled by the trailer movements. The connection may also be exposed to harsh outside environmental elements such as rain, snow, lightening, dirt or flying objects on the roadway. When docking or launching a boat, the interface may also be submerged in water. An enclosed, water-resistant interface would be extremely advantageous.

U.S. Pat. No. 3,970,860, issued to Purdy, discloses a set of relays which operate to connect or isolate different portions of signal light circuits. A trailer signal light adapter circuit is interposed between the automobile circuit and the trailer circuit to give full signal operation at all times. A relay corresponds to each of the signal light conditions and prevents nonfunctioning lights from being lit.

U.S. Pat. No. 4,325,052, issued to Koerner, discloses trailer light connection system which uses electronic light sensors to detect the light emitted by the automobile. The sensors are connected to circuits equipped with taillight switching devices.

U.S. Pat. No. 4,781,393, issued to Jeter, discloses a connector box with a six wire plug to be plugged into a socket on an automobile and a six wire socket into which the trailer plug may be attached. If the connector has less than six wires, a jumper is used which has a six prong socket on one end and a three, four or five connection plug on the other end. Each of the hot wires connected from the pickup terminate in a switch wire with a pin upon the end. Each of the trailer wires terminate in a receptacle. After a set of lights is activated on the automobile, the user must connect the pin into the different sockets until the set of lights are illuminated. Because the wires are fixed, the fuses in this patent are still susceptible to failure.

U.S. Pat. No. 5,030,938, issued to Bondzeit, discloses a trailer lighting adapter to connect the lighting systems of American trailers to American or foreign automobiles. The circuitry is powered by the automobile battery but allows negligible current drain from the automobile battery when the battery is not in use. The circuitry is fused or the current is limited to protect the electrical systems from shorts. A light emitting diode indicates a malfunction to the driver.

The foregoing patents indicate that the prior art discloses some of the locator's structures such as plugs, resistors and sockets. The present universal trailer light locator contains important improvements on the prior art to justify differentiation including a connector which can be received into any other connector, a method for testing each connector pin separately and the connection of adjustable non-taillight electrical trailer functions, such as radios, intercoms and microphones.

SUMMARY OF THE INVENTION

Accordingly, it is a broad aspect of the present invention to provide for a universal electrical and mechanical interface capable of adaptation to a variety of connector assemblies.

It is a further object of the present invention to provide a trailer interface which tests and connects each pin separately.

It is a further object of the present invention to provide a trailer interface with a versatile connector that can connect to a 3 pin, 4 pin, 5 pin or 6 pin, round, square or flat.

It is a further object of the present invention to provide a trailer interface with a pattern for selecting the correct wire for connection.

It is a further object of the present invention to provide a trailer interface that does not require any special tools for installation.

It is a further object of the present invention to provide a trailer interface which uses a test circuit and lights to indicate a proper connection.

It is a further object of the present invention to provide a trailer interface which has angled connectors to prevent damage to the connectors.

It is a further object of the present invention to provide a trailer interface which has a clip to hold the unused wires to prevent damage to the wires from contact with the road and other automobile components.

It is a still further object of the present invention to provide a trailer interface with a large resistor to prevent the destruction of fuses.

It is a still further object of the present invention to provide a trailer interface that is powered by an automobile DC battery.

It is a still further object of the present invention to provide a trailer interface that is water resistant.

It is a still further object of the present invention to provide a trailer interface with a microprocessor to automatically select the proper connection.

The foregoing objectives are met by the present device which is comprised of seven (7) input wires with six (6) versatile female connectors and one (1) versatile male connector, seven (7) output wires with seven (7) angled female connectors on the first ends and six (6) versatile male connectors and one (1) versatile female connector on the second ends, a printed circuit board, one (1) large 4.7 Ohm-25 Watt resistor, six (6) small 300 Ohm-0.5 Watt resistors, twelve (12) diodes, six (6) light emitting diodes (LED), six (6) output connector tabs, one (1) test output connector tab and a plastic casing. This device follows a pattern for selecting the correct wire. The user can test and connect each pin separately without the need for special tools. The versatile connector can adapt to any other connector with up to six (6) pins. The large resistor prevents the destruction of automobile or trailer fuses, while the angled connectors and clip prevents damage to the wire connections.

These and other objects, features and advantages of the present invention will become more apparent to those skilled in the art from the following more detailed description of the non-limiting preferred embodiment of the invention taken with reference to the accompanying Figures.

BRIEF DESCRIPTION OF THE DRAWINGS

Briefly summarized, a preferred embodiment of the invention is described in conjunction with the illustrative disclosure thereof in the accompanying drawings, in which:

FIG. 3 is a perspective view of a circuit diagram of the present invention;

FIG. 4 is a perspective view showing the versatile male connector of the present invention; and FIG. 5 is a perspective view showing the versatile female connector of the present invention.

DETAILED DESCRIPTION OF THE PREFERRED EMBODIMENT

Figure 1:
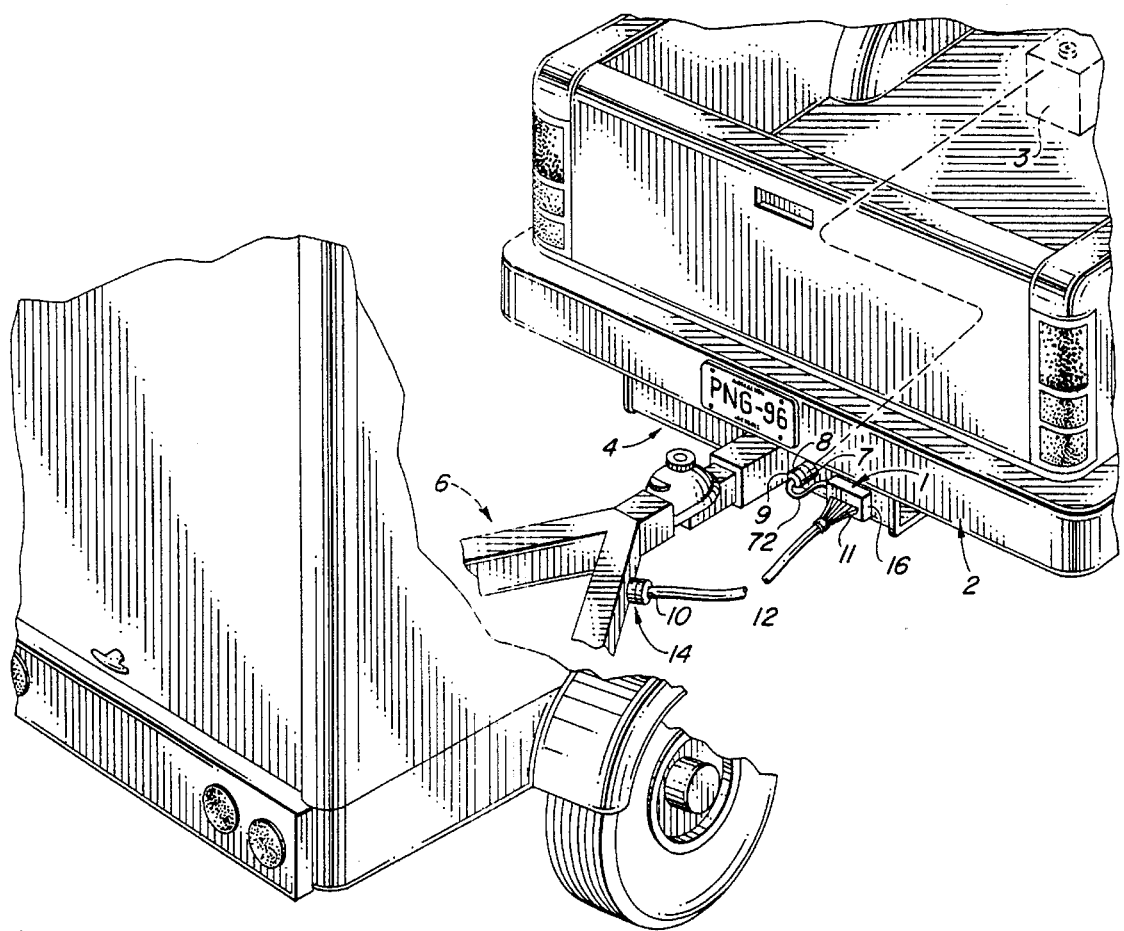
FIG. 1 is a perspective view showing a preferred embodiment of the present invention installed on an automobile and trailer.
Figure 2:
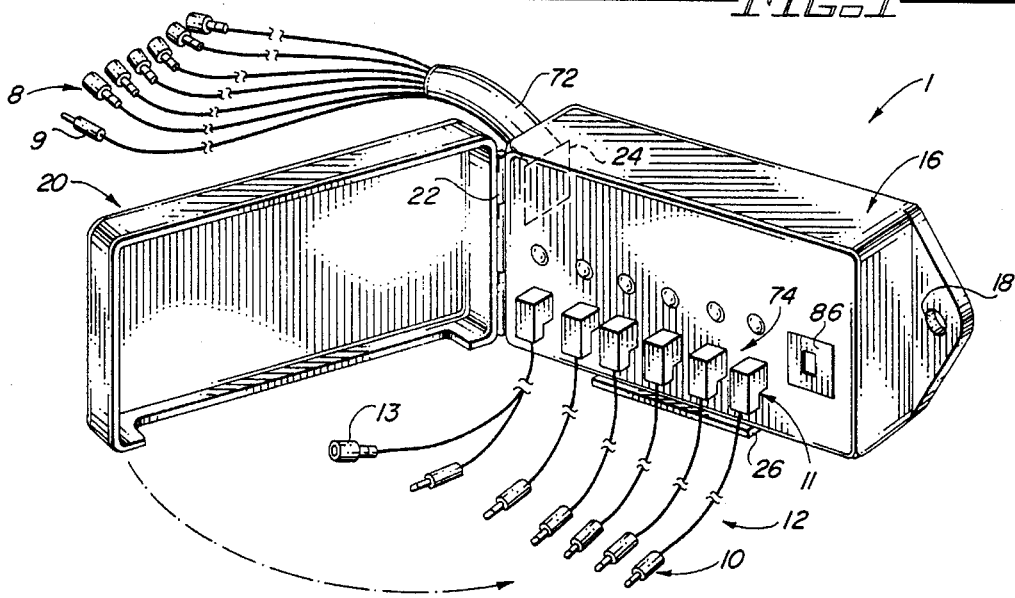
FIG. 2 is a perspective view of the preferred embodiment of the present invention.

Referring particularly to the drawings, the elements of the device of the present invention are shown. The preferred embodiment of the trailer interface 1 is disclosed as comprising seven (7) input wires 72 with six (6) versatile female connectors 8 and one (1) versatile male connector 9, seven (7) output wires 12 with seven (7) angled female connectors 11 on the first ends and six (6) versatile male connectors 10 and one (1) versatile female connector 13 on the second ends, a printed circuit board 70, one (1) large 4.7 Ohm-25 Watt resistor 84, six (6) small 300 Ohm-0.5 watt resistors 82, twelve (12) diodes 78, 80, six (6) light emitting diodes (LED) 76, six (6) output connector tabs 74, one (1) test output connector tab 86 and a plastic casing 16.

The ends of the rectangular plastic 16 casing contain a rounded extended portion with a hole 18 in its center. The apparatus 1 is mounted onto the rear end of the automobile 2 by inserting screws into holes 18. The top of the device contains an elevated cover 20 with only three side faces. The open side of the cover 20 allows the output wires 12 to exit the plastic casing 16 when the cover 20 is closed. The cover rotates counterclockwise around a hinge 22 which is located on the side of the casing 16.

The twelve (12) volt automobile DC battery 3 distributes voltage across the various electrical components of the automobile 2. Additional wires carry the voltage from the electrical components to the male automobile plug 7. Each prong of the male automobile plug 7 is reciprocally received into the versatile female connector 8 of the input wire 72. The input wire 72 carries the current from the automobile plug 7 into the present invention 16. If one prong of the automobile plug 7 is female, one of the input wires 72 has a versatile male connector 9 which can connect to the female automobile plug 7. The side of the device has a rectangular notch 24 which allows the input wires 72 to enter the plastic casing 16. The output wires 12 are reciprocally received into ninety (90) degree angled female connectors 11. The ninety (90) degree angled female connectors are reciprocally received onto the output connector tabs 74. The open side of the cover 20 allows the angled output wires 12 to exit in parallel with the top of the plastic casing 16 when the cover 20 is closed. The versatile male connectors 10, located on the distal ends of the output wires 12, are reciprocally received into the existing female trailer plug 14. If one prong of the trailer plug 14 is male, one of the output wires 12 has a versatile female connector 13 which can connect to the male trailer plug 14.

The versatile male connector 10 is composed of brass and beryllium copper components inside a nylon housing 30. The output wire 12 is reciprocally received into the open flared end 32 of the versatile male connector 10, then crimped inside the central recessed portion of the connector 34 to form an electrical contact. The opposite end of the connector is composed of a smaller flared end 36 with a brass dowel 38 reciprocally received into the end and protruding out from the end. A symmetrical cross 40 of beryllium copper is evenly folded over the protruding brass dowel with the narrower ends of the cross reciprocally received and soldered into the thick brass ring 42 which encircles the bottom of the brass dowel. The versatile male connector can adapt to any female connector with 0.140–0.200 inch diameter.

The versatile female connector 8 is composed of brass and beryllium copper components inside a nylon housing 50. The output wire 12 is reciprocally received into the open flared end 52 of the versatile female connector 8, then crimped inside the central recessed portion 54 of the versatile female connector 8 to form an electrical contact. The opposite end of the versatile female connector 8 is also flared 56 with four beryllium copper lead contacts 58 inside of the nylon housing 50. The innermost ends of the lead contacts are anchored 60 around a brass dowel. Towards the end of the versatile female connector 8, the lead contacts 58 are bent 62 towards the center of the connector which serves as a retractable spring to provide a firm contact around any inserted male connector. A 0.3 inch slot 64 is cut into the lead contact to allow additional expansion. The preferred embodiment of the versatile female connector 8 is flexible for a 0.140–0.200 inch diameter male connector.

Each positive twelve (12) volt DC input is connected to one of the input wires 72 and is distributed across a network of three diodes. An output wire 12 is connected to the test output connector 86. The input voltage 72 is connected to the circuit to test output connector 86. When the voltage is placed across the input wire 72, the voltage will illuminate the corresponding LED 76. A voltage drop occurs across the small resistor 82 characterized by the product of the current dissipated through the resistor 82 and the resistance value 82. The diode 78 prevents current feedback through the input wire 72 and output connector tabs 74. Current passes through the diode 80 and through the resistor 84 and then exits through the test output connector 86 to indicate proper connection. Next, the output wire 12 is removed off of the test output connector 86 and placed upon the tab 74 corresponding with the illuminated LED 76. This creates a proper connection between the automobile 2 and the corresponding electrical device on the trailer 6. This process is repeated for each electrical connection between the automobile 2 and the trailer 6. The electrical connections can be the ground, running lights, left blinker/brake light, right blinker/brake light, electric trailer brakes or a charging circuit. Any of the output wires 12 that are not connected can be stored by inserting them into the clip 26 on the side of the casing 16. Another preferred embodiment will incorporate a microprocessor to control the connection selection.

It will be apparent to those skilled in the art, that the foregoing detailed description of the preferred embodiment of the present invention is representative of a type of trailer interface device within the scope and spirit of the present invention. Further, those skilled in the art will recognize that various changes and modifications may be made without departing from the true spirit and scope of the present invention. Those skilled in the art will recognize that the invention is not limited to the specifics as shown here, but is claimed in any form or modification falling within the scope of the appended claims. For that reason, the scope of the present invention is set forth in the following claims.

What is claimed is:

1. A universal electrical and mechanical trailer interface comprising:
   (a) a printed circuit board;
   (b) a casing having a top cover, a plurality of sides and at least one hinge, said casing enclosing said circuit board;
   (c) a plurality of resistors and connector tabs incorporated onto said circuit board;
   (d) a plurality of indicating means for verifying a proper connection, said indicating means incorporated onto said circuit board;
   (e) a plurality of angled female connectors reciprocally received onto said connector tabs;
   (f) a plurality of input wires in communication with said circuit board;
   (g) a plurality of output wires having distal ends, said output wires in communication with said angled female connectors;
   (h) a plurality of versatile female connectors having open flared ends, a central recessed portion and a center;
   (i) at least one versatile male connector having open flared ends, a central recessed portion and a center, said versatile male connector reciprocally receiving said input wires; and
   (j) a plurality of said versatile male connectors having open flared ends, a central recessed portion and a center, said versatile male connectors reciprocally receiving said output wires.

2. The trailer interface of claim 1, wherein said circuit board consists of a water-resistant material.

3. The trailer interface of claim 1, wherein said casing includes a rectangular box having a rounded extended portion on both sides, said rectangular box having an opening in the center of each of said extended portions for mounting said casing onto an automobile.

4. The trailer interface of claim 3, wherein said top of said casing contains said elevated cover, said elevated cover having three side faces for allowing said output wires to exit said casing when said elevated cover is in a closed position.

5. The trailer interface of claim 3, wherein said elevated cover rotates counterclockwise around said hinge located on said side of said casing.

6. The trailer interface of claim 1, wherein said casing consists of plastic.

7. The trailer interface of claim 1, wherein said angled female connectors having a ninety (90) degree angle allowing said output wires to exit in parallel to said casing.

8. The trailer interface of claim 1, wherein said versatile female connector adapts to any male connector having 0.140 to 0.200 inch diameter.

9. The trailer interface of claim 1, wherein said versatile female connector comprising brass and beryllium copper components inside a first nylon housing.

10. The trailer interface of claim 1, wherein said end of said versatile female connector being flared and having four beryllium copper lead contacts having ends and a brass dowel, said contacts located inside said first nylon housing.

11. The trailer interface of claim 10, wherein said innermost ends of said lead contacts being anchored and soldered around said brass dowel.

12. The trailer interface of claim 10, wherein said lead contacts being bent towards said center of said versatile female connector, serving as a retractable spring to provide a firm contact around any inserted male connector.

13. The trailer interface of claim 10, wherein said lead contacts contain a slot for allowing additional expansion.

14. The trailer interface of claim 1, wherein said open flared end of said versatile female connector reciprocally receives said output wire, said output wire crimped inside said central recessed portion of said versatile female connector forming an electrical contact.

15. The trailer interface of claim 1, wherein each of said versatile female connectors reciprocally receive a prong of a male automobile plug respectively, carrying current from said male automobile plug into said circuit board through said input wire.

16. The trailer interface of claim 1, wherein said versatile male connector adapts to any female connector having 0.140 to 0.200 inch diameter.

17. The trailer interface of claim 1, wherein said versatile male connector comprising brass and beryllium copper components inside a second nylon housing.

18. The trailer interface of claim 1, wherein said open flared end of said versatile male connector reciprocally receiving said output wire, said distal end of said output wire crimped inside said central recessed portion of said versatile male connector forming an electrical contact.

19. The trailer interface of claim 1, wherein said open flared end of said versatile male connector comprising a long cylindrical extension.

20. The trailer interface of claim 1, wherein said input wires include at least one said versatile male connector allowing communication with said female prongs on said automobile plug.

21. The trailer interface of claim 1, wherein each of said female prongs on said automobile plug reciprocally receive each of said versatile male connectors respectively, said male prong on said automobile plug reciprocally receives said versatile female connector.

22. The trailer interface of claim 1, wherein said output wires that are not connected being stored in a clip on said side of said casing.

23. The trailer interface of claim 1, wherein said indicating means includes a plurality of light emitting diodes.

\* \* \* \* \*